DEVICE FOR DIRECTIONALLY CONTROLLING ELECTROMAGNETIC RADIATION
Filed March 5, 1964
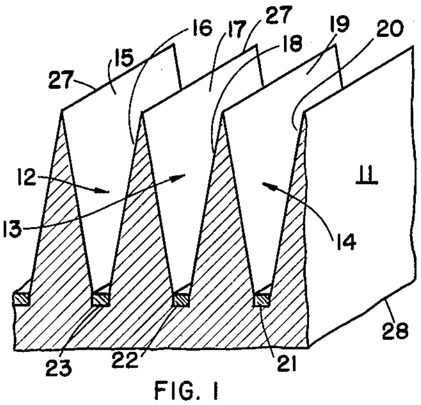
FIG. 1
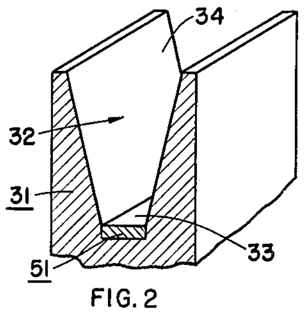
FIG. 2
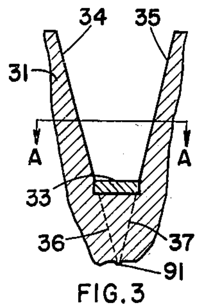
FIG. 3
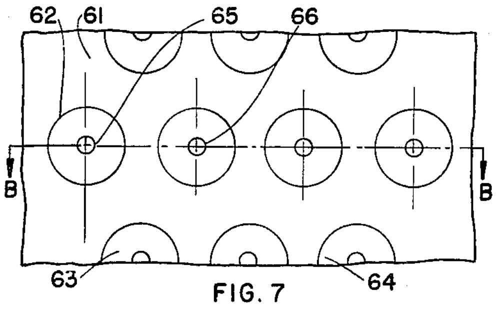
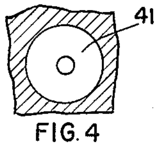
FIG. 4
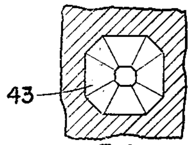
FIG. 6
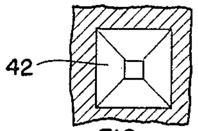
FIG. 5
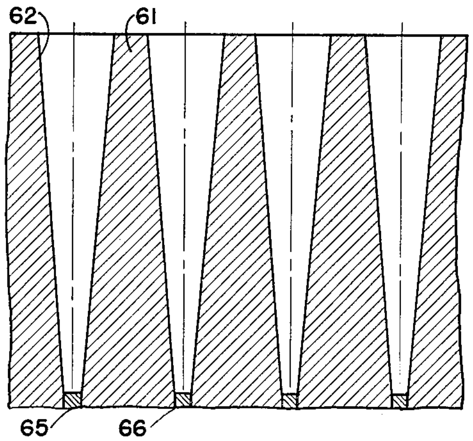
FIG. 8
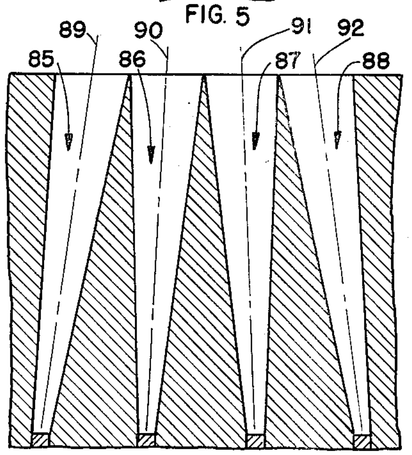
FIG. 9
INVENTORS
MORRIS PERLMUTTER
JOHN R. HOWELL
BY
ATTORNEYS United States Patent Office 3,229,682
Patented Jan. 18, 1966

3,229,682
DEVICE FOR DIRECTIONALLY CONTROLLING ELECTROMAGNETIC RADIATION

Morris Perlmutter, Cleveland, and John R. Howell, North Ridgeville, Ohio, assignors to the United States of America as represented by the Administrator of the National Aeronautics and Space Administration Filed Mar. 5, 1964, Ser. No. 349,778
5 Claims. (Cl. 126—270)
(Granted under Title 35, U.S. Code (1952), sec. 266)

The invention described herein may be manufactured by or for the Government of the United States without the payment of any royalties thereon or therefor.

The present invention relates to the transfer of radiant energy and more particularly, to an apparatus which can be used for either directing the emission of electromagnetic radiation in preferred directions or absorbing electromagnetic radiation only from desired angular ranges.

In utilizing electromagnetic radiation, it is often desirable to directionally control the path of electromagnetic waves. For example, in thermal energy converting devices such as a solar cell or a thermionic emitter, it is often desirable to direct inward toward the absorbing surface of the cell the solar radiation. It is also desirable to selectively control the incident solar energy so that energy incident over a preferred range of angles will strike the absorbing surface and energy incident at undesirable angles will be reflected therefrom. In devices emitting electromagnetic radiation, it is often desired to directionally control the radiation given out, that is to direct the radiation in a particular direction and over a particular angular range.

For collecting and directing incident solar radiation toward a solar energy converter, devices such as a parabolic solar mirror have heretofore been used. Other prior art devices have also been used wherein radiant waves coming from one direction are deflected toward and absorbing surface and radiant waves coming from another direction are deflected away from the absorbing surface. Examples of devices of this type are disclosed in U.S. Patents 2,625,930 and 3,001,331. These patents disclose devices relating to thermal covering for roofs. Although, in general, these devices have performed satisfactorily for the limited purpose for which they were intended, devices of this type have not been found to be suitable for directional emission or reflection effects needed in space and furnace applications, are not flexbile in application, and are more costly to fabricate.

The general purpose of this invention is to provide for a new and improved surface structure which embraces all of the advantages of similar prior art structures and none of the aforedescribed disadvantages. To attain this, the present invention contemplates shaping the macroscopic surface structure or more specifically by providing for a unique arrangement of reflecting and absorbing surfaces which are responsive to thermal radiations. By selectively arranging the absorbing and reflecting surfaces in the manner herein described, these results can be obtained. The present invention can be used as both a collector of radiant energy from a particular range of angles and an emitter of radiant energy over a prescribed range of angles.

An object of the present invention is to provide for a novel and improved thermal responsive apparatus which can be used to direct solar energy toward an energy converter.

Another object of this invention is to provide for a new and improved thermal energy responsive structure which can be used to change the direction of radiant waves.

Still another object of this invention is to provide for a new and improved thermal energy responsive structure which can either be used to converge inward or direct outward toward a specific area radiant energy.

Yet still another object of this invention is to provide for a new and improved thermal energy responsive structure which will direct in toward a thermal converter radiant energy from certain desired directions and reflect outward radiant waves from other undesired directions.

Another object of this invention is to provide for a new and improved arrangement of a thermal energy absorbing element and a reflector for controlling the direction of radiant waves toward a thermal energy converter.

Still another object of this invention is to provide for a new and improved arrangement of an emitter of radiant energy and a reflector for directing the emitted radiant energy in a particular direction.

Yet another object of this invention is to provide for a radiant energy responsive apparatus that is flexible in application, easy to fabricate, and is inexpensive.

Still another object of this invention is to provide for a new and improved thermal energy transmitter having a high efficiency in respect to the absorption of radiant energy.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIG. 1 is a perspective view of a preferred embodiment of the invention.

FIG. 2 is a perspective view of another embodiment of the invention.

FIG. 3 is a front section view of the embodiment shown in FIG. 2.

FIG. 4 is a top view of a modification of the embodiment of FIG. 2 taken along section A—A in FIG. 3.

FIG. 5 is a top view of another modification of the embodiment of FIG. 2 taken along section A—A in FIG. 3.

FIG. 6 is a top view of another modification of the embodiment of FIG. 2 taken along section A—A in FIG. 3.

FIG. 7 is a top section view of a modification of the embodiment of FIG. 3 taken along section A—A consisting of a plurality of the conical cavities shown in the FIG. 4 embodiment.

FIG. 8 is a vertical section of the embodiment shown in FIG. 7 taken along axes B—B.

FIG. 9 is a modified version of the embodiment shown in FIG. 8.

Referring now to the drawings, there is shown in FIG. 1, which illustrates a preferred embodiment of the invention, an elongated body member generally referred to by reference numeral 11, and having an upper edge 27 and a lower edge 28. The main body member 11 is fabricated from any suitable material and is provided with a plurality of longitudinally disposed inwardly extending grooved cavity portions 12, 13, and 14 formed by pairs of converging sidewalls 15–16, 17–18, and 19–20. The wall portions 15 through 20 are coated with any type of highly reflective or specular material having high reflective properties such as polished plated gold, silver, or copper. As an alternative embodiment, rather than merely coating the sidewalls 15–20 with a reflective material, the entire body member 11 could be formed or fabricated from a material that itself has these highly reflective properties. Positioned within each one of the cavity portions of the device is a thermal energy transferring element identified by reference numerals 21, 22, and 23. The thermal energy transferring elements are members having high emitting or absorbing characteristics and are commonly referred to by persons of ordinary skill in the art as black bodies or black thermal elements.

FIG. 2 is a simplified version of the device wherein the main body member 31 is provided with merely a single cavity portion 32 and in all other respects is similar to the embodiment shown in FIG. 1. The highly absorbing or emitting surface of the black thermal element 51 is designated by reference numeral 33. The sidewall portions of the cavity are designated by reference numerals 34 and 35. Black body element 51 is secured within the cavity portion of body member 31 in any known manner. The entire element 51 could, if desired, be fabricated from a material having high absorption characteristics rather than merely have surface 33 coated therewith. The term black thermal element is intended to include devices such as heat radiators, solar cells, and the like. The black thermal element is shown positioned upward from the bottom surface of the main body. However, said elements could be positioned flush with said bottom surface, if desired. This would depend in part on the particular use of the device.

In FIG. 3 is shown a front sectional view of the embodiment of the invention shown in FIG. 2. As shown in FIG. 3, the cavity portion is in the form of a longitudinally disposed groove wherein the sidewall portions 34 and 35 are symmetrically disposed about a vertical plane through the body of the device, are inwardly extending and, if as shown by the dotted lines 36, 37, extended would meet and intersect the above-mentioned vertical plane. Surface 33 of black thermal element 51 is shown lying in a plane normal to the above-mentioned vertical plane and bisected thereby. It is also noted that the absorbing or emitting surface 33 is positioned outward from the point of intersection 91 of the two converging surfaces 34, 35 if said surfaces were to be extended. It is also noted that in the embodiment shown in FIG. 2, the sidewall surfaces are planar. The cavity need not be in the form of a longitudinal V-shaped groove as shown in the embodiment in FIG. 2.

The cavity could be in the shape, for example of an inverted pyramid. The term pyramid, as used herein, is intended to configurations in which the base is either a circle or a polygon. Three examples of such alternative embodiments are shown in FIGS. 4 through 6 which constitute horizontal sectional views showing the cross-sectioned areas of various types of cavities. In the alternative embodiment shown in FIG. 4, the base of the pyramid-like cavity is circular, in another alternative embodiment shown in FIG. 5 the base of the pyramid-like cavity is rectangular and in the alternative embodiment shown in FIG. 6, the base of the pyramid-like cavity is octagonal. In the FIG. 4 embodiment the reflecting sidewalls 41 are non-planar whereas in the FIGS. 5 and 6 embodiments the sidewalls 42 and 43 are flat.

Although not specifically shown, the cavity sidewalls could also be parabolic.

In FIG. 7 is shown a partial top section view of a modified version of the device shown in FIG. 1. In this embodiment of the device, the main body member 61 has a plurality of conically-shaped cavities 62, 63, 64, etc., of the type shown in FIG. 4 rather than a plurality of elongated V-shaped grooved cavities as shown in FIG. 1. The black thermal transferring surfaces are designated by reference numerals 65 and 66.

FIG. 8 is a vertical section view of the embodiment shown in FIG. 7.

FIG. 9 is shown a section view similar to FIG. 8 of still another embodiment of the device wherein the conically shaped cavities 85 through 88 are asymmetrically disposed relative to each other. The axes of each of these cavities are not parallel and could even be arranged so as to meet at a common point. The other disclosed embodiments could likewise be modified in a similar manner. The axes in FIG. 9 are identified by reference numerals 89, 90, 91, and 92.

It has been found that by means of disposing a black body within a cavity of a highly reflective surface in the manner shown in the various embodiments herein described it is possible to provide for a more nearly perfect directional surface, that is, one which will have an emissivity or absorptivity of one over a prescribed range of angles and an emissivity or absorptivity or zero over the remaining angles.

The instant invention could be used and would have practical application in, for example, the operation of a satellite. There, solar energy would be collected by this device and directed toward a solar cell which would convert the solar energy to electrical energy which could, in turn, be used to operate the radio equipment on the satellite. In this case, an open cavity angle of 5 degrees with the black thermal element 10 percent of the way up from the hypothetical vertex will absorb all the incident solar energy and reduce losses to space to within a range of about six degrees. Increasing the groove angle or moving the black element upwards will increase the energy losses.

In an article appearing in the "Journal of Heat Transfer," March 1963, by Morris Perlmutter and John R. Howell, entitled "The Angular Distribution of Emitted and Reflected Radiant Energy from Diffuse Gray Asymmetric Grooves," the results obtained by varying the above-mentioned factors, the mathematical theory, and other related matters are disclosed.

It should be understood of course, that the foregoing disclosure relates to only preferred embodiments of the invention and that numerous alternations or modifications may be made therein without departing from the spirit and scope of the invention as set forth in the appended claims.

Having thus described the invention, what is claimed is:

1. A device for emitting or absorbing electromagnetic energy comprising a main body member having a cavity portion, said cavity portion having inwardly converging sidewalls of highly reflective material, said converging sidewalls being directed toward a common point of intersection, said converging sidewalls of the cavity portion forming an angle of five degrees at said point of intersection, and a black body member positioned within said cavity portion and spaced upward from the common point of intersection a distance of one-tenth of the depth of the cavity portion.

2. A device for emitting or absorbing electromagnetic energy comprising a main body member having a plurality of cavity portions, each of said cavity portions having a longitudinal axis, said cavity portions having inwardly converging sidewalls of highly reflective material, each of said cavity portions being symmetrical above its longitudinal axis, said longitudinal axes being nonparallel, and a black body member disposed within each of said cavity portions, said longitudinal axes of said cavity portions being outwardly converging toward a common point.

3. The device according to claim 2 wherein said inwardly converging sidewalls are directed toward a common point of intersection at an angle of five degrees and wherein said black body member disposed in each cavity portion is spaced upward from the common point of intersection of said sidewalls at a distance equal to one-tenth of the depth of the cavity.

4. The device according to claim 3 wherein each of said cavity portions are conically shaped.

5. The device according to claim 3 wherein each of said cavity portions are in the shape of a pyramid.

References Cited by the Examiner

UNITED STATES PATENTS

| | | | |
|---|---|---|---|
| 980,505 | 1/1911 | Emmett | 126—271 |
| 2,969,788 | 1/1961 | Newton | 126—271 |
| 3,089,670 | 5/1963 | Johnson. | |

FOREIGN PATENTS

| | | |
|---|---|---|
| 811,015 | 1/1937 | France. |
| 387,828 | 2/1933 | Great Britain. |

FREDERICK L. MATTESON, Jr., *Primary Examiner.*

CHARLES J. MYHRE, *Examiner.*

JAMES W. WESTHAVER, *Assistant Examiner.*